United States Patent [19]

Wiggins et al.

[11] 4,243,725

[45] Jan. 6, 1981

[54] TIE LAYER FOR CO-EXTRUDED ACRYLONITRILE COPOLYMERS

[75] Inventors: Wayne T. Wiggins, Aurora; Frank S. Gerry, Hudson, both of Ohio

[73] Assignee: Standard Oil Company, Cleveland, Ohio

[21] Appl. No.: 99,113

[22] Filed: Nov. 29, 1979

[51] Int. Cl.³ .................... B32B 27/28; B32B 27/32
[52] U.S. Cl. ...................... 428/517; 156/244.11; 156/243; 264/171; 428/518; 428/519; 428/520; 428/522
[58] Field of Search ............ 428/520, 518, 522, 517, 428/519; 264/171; 156/243, 244.11

[56] References Cited

U.S. PATENT DOCUMENTS

| | | | |
|---|---|---|---|
| 3,426,102 | 2/1969 | Solak | 525/310 |
| 3,682,768 | 8/1972 | Adams | 428/520 |
| 3,993,810 | 11/1976 | Bonis | 428/517 |
| 4,081,424 | 3/1978 | Gergen | 525/184 |
| 4,100,237 | 7/1978 | Wiley | 264/171 |
| 4,101,702 | 7/1978 | Churchill | 428/520 |
| 4,123,576 | 10/1978 | Kobayashi | 428/516 |
| 4,139,665 | 2/1979 | Herrero | 428/520 |

FOREIGN PATENT DOCUMENTS 49-39656  4/1974  Japan .

*Primary Examiner*—Ellis P. Robinson
*Attorney, Agent, or Firm*—William D. Mooney; Herbert D. Knudsen; Larry W. Evans

[57] ABSTRACT

A blend of a styrene-butadiene block copolymer rubber, a nitrile barrier resin, and a high impact polystyrene is used as a tie layer to adhere together co-extruded nitrile barrier resin and high impact polystyrene.

10 Claims, No Drawings

TIE LAYER FOR CO-EXTRUDED ACRYLONITRILE COPOLYMERS

This invention relates to a mixture of a styrenebutadiene block copolymer rubber, a nitrile barrier resin, and a high impact polystyrene, and to the use of this mixture as a tie layer to adhere together a co-extruded nitrile barrier resin and a high impact polystyrene.

Composite layers composed of at least one layer of a high impact polystyrene and at least one layer of a nitrile barrier resin have been prepared and are found to be useful for many purposes including packaging of materials of many types. Packages of such composites have excellent gas barrier properties, they are particularly good barriers to oxygen, carbon dioxide, and to water vapor, and they can be fabricated by heat sealing by virtue of the excellent heat-sealing properties of the impact-resistant polystyrene. Manufacture of such composites is not easy because of the lack of adhesive between the surfaces of the polystyrene and the nitrile barrier resin.

We have discovered that composite structures of impact-resistant polystyrene and nitrile barrier resins can be made, particularly in a co-extrusion process, by employing as a tie layer for adhering the polymer surfaces together a mixture of (1) an elastomeric styrene-butadiene block copolymer, (2) a nitrile barrier resin and (3) an impact-resistant polystyrene. The proportions of these materials and the temperature at which the mixture is extruded effect both adhesion and viscosity control in the co-extrusion process.

One decided advantage in the present invention is the fact that the scrap material can be reground and used in the tie layer with some adjustment of the three essential components mentioned above.

The nitrile barrier resins useful in the present invention include those prepared by the polymerization of (A) from 60 to 90% by weight of at least one nitrile having the structure

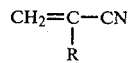

wherein R is hydrogen, a lower alkyl group having from 11 to 4 carbon atoms, or a halogen, (B) from 10 to 40% by weight based on the combined weight of (A) and (B) of at least one member selected from the group consisting of (1) an ester having the structure

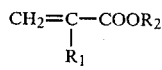

wherein $R_1$ is hydrogen, an alkyl group having from 1 to 4 carbon atoms, or a halogen, and $R_2$ is an alkyl group having from 1 to 6 carbon atoms, (2) an alpha-olefin having the structure

wherein R' and R" are alkyl groups having from 1 to 7 carbon atoms, (3) a vinyl ether selected from the group consisting of methyl vinyl ether, ethyl vinyl ether, the propyl vinyl ethers, and the butyl vinyl ethers, (4) vinyl acetate, (5) styrene, and (6) indene, in the presence of from 0 to 40 parts by weight of (C) a rubbery polymer of a conjugated diene monomer selected from the group consisting of butadiene and isoprene and optionally a comonomer selected from the group consisting of styrene, a nitrile monomer having the structure

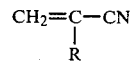

wherein R has the foregoing designation, and an ester having the structure

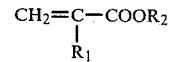

wherein $R_1$ and $R_2$ have the foregoing designations, said rubbery polymer containing from 50 to 100% by weight of polymerized conjugated diene and from 0 to 50% by weight of comonomer.

The impact-resistant polystyrene useful in the present invention includes rubber-modified polystyrenes which have improved resistance to impact over that possessed by polystyrene itself. Impact polystyrenes are available in many different varieties. Impact-resistant polystyrene has most of the advantages of polystyrene, such as rigidity, ease of fabrication, and variety of colors and granules commercially available. In addition, these impact polymers are tough and resistant to abuse. Because they are two-phase systems, they generally are not available in transparent forms. Some translucent varieties in the medium-impact strength range can be obtained, however. In rubber-modified polystyrenes, the rubber is dispersed in the polystyrene matrix in the form of discrete particles. The nature of these particles and of the particle-matrix interface involves some complex questions, such as the true cross-link density of elastomers, occlusions, particle size and size distribution, etc., which are not fully understood at the present time. High impact polystyrene usually contains about 5 to 10% of polybutadiene or styrene-butadiene copolymer. However, special grades of higher impact resistance are available up to about 25% of rubber. The high impact polystyrenes are available in "high heat", "easy flow", and other formulations, and are used for injection molding, extrusion, thermo-forming and blow molding. Usually, many different formulations are offered by the manufacturers as tailor-made polymers to meet the specific fabrication and property requirements of a given application.

The elastomeric block copolymers of styrene and butadiene embodied in this invention are well known block copolymers of the type polystyrene-polybutadiene-polystyrene (SBS) which behave like reinforced vulcanized elastomers at room temperature. A typical SBS copolymer contains about 30% of polymerized styrene and 70% of polymerized butadiene.

The process and compositions of this invention are preferably used in conjunction with the co-extrusion process. Specifically, two dissimilar materials are made to adhere to one another during shaping while in the molten phase. The three tie-layer materials are weighed and blended in powder form before use in the co-extrusion process. The powder blend is then fed into the tie-layer extruder hopper and the blend is melted and mixed in the extruder barrel. The tie-layer blend then is extruded through a co-extrusion sheet die between the two outside layers (high impact polystyrene and an acrylonitrile barrier resin) in a continuous fashion forming a laminated sheet. In this process, the three polymer melt streams are combined into the laminated structure by means of a co-extrusion adapter and die in a one-step, in-line manufacturing operation. This allows the components to flow together to form the desired multilayer structure.

The tie-layer melt can be extruded within the temperature range of 300° to 450° F. Preferably, the melt should be extruded between 390° to 410° F.

The components of the tie-layer blend can vary widely from 100% to 10% by weight of SBS elastomer, from 75% to 0% by weight of high impact polystyrene, and from 75% to 0% by weight of nitrile barrier resin. The most preferred blend is one having about 60 to 80% by weight of SBS elastomer, about 10 to 20% by weight of nitrile barrier resin, and about 10 to 20% by weight of high impact polystyrene.

In the extrusion of the tie layer, all components are quite stable thermally and are not adversely effected by long residence times in the extruder. Preferably, the material should remain in the extruder only long enough to accomplish the melt blending and to achieve the proper melt-flow temperature.

Although pressures of 5000 psi or greater may be reached in the die in the co-extrusion of the tie layer, pressures on the order of 2500 psi are more normal.

The invention is further illustrated in the following examples wherein the amounts of ingredients are expressed in parts by weight unless otherwise indicated.

EXAMPLE 1

A powdered mixture of 60 parts by weight of SBS (Shell's Kraton 2103, a styrene-butadiene-styrene block copolymer elastomer), 20 parts by weight of high impact polystyrene (Arco's Dylene 601, a rubber-modified polystyrene), and 20 parts by weight of a nitrile rubber-modified acrylonitrile-methyl acrylate copolymer prepared according to Example VIII in U.S. Pat. No. 3,426,102 was extruded through a ¾-inch Brabender extruder through a 3-way combining adapter and through a 6-inch co-extrusion die as a tie layer. The melt temperature of the tie layer was about 390° to 400° F. Simultaneously, the nitrile rubber-modified acrylonitrile-methyl acrylate copolymer and high impact polystyrene were also co-extruded on either side of the tie layer. A resulting three-layer laminate was produced. An adhesion of the tie layer to the outer layers of the laminate 1.2 pounds per linear inch was found. The total thickness of the laminate was found to be 10 mils.

EXAMPLE 2

The procedure of Example 1 was repeated except that the tie-layer blend was made up of 80 parts by weight of SBS, 10 parts by weight of high impact polystyrene, and 10 parts by weight of the nitrile rubber-modified acrylonitrile-methyl acrylate copolymer. Adhesion between the layers was found to be 2.5 pounds per linear inch.

We claim:

1. A laminated structure comprising
(I) a first outer layer composed of a nitrile barrier resin,
(II) a second intermediate layer comprising a mixture of
    (1) a nitrile barrier resin (I),
    (2) a rubber-modified high impact polystyrene, and
    (3) a styrene-butadiene-styrene block copolymer elastomer, and
(III) a third outer layer composed of a rubber-modified high impact polystyrene.

2. The structure of claim 1 wherein the nitrile barrier resin (I) is one prepared by the polymerization of
(A) from 60 to 90% by weight of at least one nitrile having the structure $$CH_2=C-CN$$
$$|$$
$$R$$

wherein R is hydrogen, a lower alkyl group having from 1 to 4 carbon atoms, or a halogen,
(B) from 10 to 40% by weight based on the combined weight of (A) and (B) of at least one member selected from the group consisting of
    (1) an ester having the structure $$CH_2=C-COOR_2$$
$$|$$
$$R_1$$

wherein $R_1$ is hydrogen, an alkyl group having from 1 to 4 carbon atoms, or a halogen, and $R_2$ is an alkyl group having from 1 to 6 carbon atoms,
    (2) an alpha-olefin having the structure $$R'$$
$$|$$
$$CH_2=C$$
$$|$$
$$R''$$

wherein R' and R" are alkyl groups having from 1 to 7 carbon atoms,
    (3) a vinyl ether selected from the group consisting of methyl vinyl ether, ethyl vinyl ether, the propyl vinyl ethers, and the butyl vinyl ethers,
    (4) vinyl acetate,
    (5) styrene, and
    (6) indene,
in the presence of from 0 to 40 parts by weight of
(C) a rubbery polymer of a conjugated diene monomer selected from the group consisting of butadiene and isoprene and optionally a comonomer selected from the group consisting of styrene, a nitrile monomer having the structure $$CH_2=C-CN$$
$$|$$
$$R$$

wherein R has the foregoing designation, and an ester having the structure $$CH_2=C-COOR_2$$
$$|$$
$$R_1$$

wherein $R_1$ and $R_2$ have the foregoing designations, said rubbery polymer containing from 50 to 100% by weight of polymerized conjugated diene and from 0 to 50% by weight of comonomer.

3. The structure of claim 2 wherein (A) is acrylonitrile.

4. The structure of claim 3 wherein (B) is methyl acrylate.

5. The structure of claim 4 wherein (C) is a butadiene-acrylonitrile rubbery polymer.

6. The co-extrusion process wherein there are adhered together in the molten phase at a temperature in the range of 300° to 450° F. and passed through a shaping die to form a laminate of
(I) a first outer layer composed of a nitrile barrier resin,
(II) a second intermediate layer comprising a mixture of
  (1) a nitrile barrier resin (I),
  (2) a rubber-modified high impact polystyrene, and
  (3) a styrene-butadiene-styrene block copolymer elastomer, and
(III) a third outer layer composed of a rubber-modified high impact polystyrene.

7. The process of claim 6 wherein the nitrile barrier resin (I) is one prepared by the polymerization of
(A) from 60 to 90% by weight of at least one nitrile having the structure

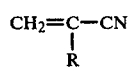

wherein R is hydrogen, a lower alkyl group having from 1 to 4 carbon atoms, or a halogen,
(B) from 10 to 40% by weight baseed on the combined weight of (A) and (B) of at least one member selected from the group consisting of
(1) an ester having the structure $$CH_2=C-COOR_2$$
$$\phantom{CH_2=C-}R_1$$

wherein $R_1$ is hydrogen, an alkyl group having from 1 to 4 carbon atoms, or a halogen, and $R_2$ is an alkyl group having from 1 to 6 carbon atoms,
(2) an alpha-olefin having the structure

wherein R' and R'' are alkyl groups having from 1 to 7 carbon atoms,
(3) a vinyl ether selected from the group consisting of methyl vinyl ether, ethyl vinyl ether, the propyl vinyl ethers, and the butyl vinyl ethers,
(4) vinyl acetate,
(5) styrene, and
(6) indene,
in the presence of from 0 to 40 parts by weight of
(C) a rubbery polymer of a conjugated diene monomer selected from the group consisting of butadiene and isoprene and optionally a comonomer selected from the group consisting of styrene, a nitrile monomer having the structure

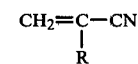

wherein R has the foregoing designation, and an ester having the structure

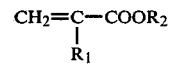

wherein $R_1$ and $R_2$ have the foregoing designations, said rubbery polymer containing from 50 to 100% by weight of polymerized conjugated diene and from 0 to 50% by weight of comonomer.

8. The process of claim 7 wherein (A) is acrylonitrile.

9. The process of claim 8 wherein (B) is methyl acrylate.

10. The process of claim 9 wherein (C) is a butadiene-acrylonitrile rubbery polymer.

* * * * *